United States Patent
Will et al.

(10) Patent No.: US 11,621,834 B2
(45) Date of Patent: Apr. 4, 2023

(54) SYSTEMS AND METHODS FOR PRESERVING DATA INTEGRITY WHEN INTEGRATING SECURE MULTIPARTY COMPUTATION AND BLOCKCHAIN TECHNOLOGY

(71) Applicant: Acronis International GmbH, Schaffhausen (CH)

(72) Inventors: Mark A Will, Singapore (SG); Sanjeev Solanki, Singapore (SG); Kailash Sivanesan, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 107 days.

(21) Appl. No.: 16/901,343

(22) Filed: Jun. 15, 2020

(65) Prior Publication Data
US 2021/0391983 A1    Dec. 16, 2021

(51) Int. Cl.
*H04L 9/08*      (2006.01)
*H04L 9/32*      (2006.01)
(Continued)

(52) U.S. Cl.
CPC ............ *H04L 9/085* (2013.01); *H04L 9/0643* (2013.01); *H04L 9/0869* (2013.01);
(Continued)

(58) Field of Classification Search
None
See application file for complete search history.

(56) References Cited

U.S. PATENT DOCUMENTS

| | | | | |
|---|---|---|---|---|
| 2016/0261409 A1* | 9/2016 | French | ................ | H04L 9/3234 |
| 2020/0213099 A1* | 7/2020 | Wright | ................ | H04L 9/3255 |
| 2020/0366462 A1* | 11/2020 | Kolte | ................ | H04L 9/3242 |

FOREIGN PATENT DOCUMENTS

EP      3439233 A1 *   2/2019     ............. H04L 9/085

OTHER PUBLICATIONS

Zyskind, Guy "Efficient Secure Computation Enabled by Blockchain Technology" [online], MIT, Jun. 2016 [retrieved Feb. 23, 2022], Retrieved from the Internet: URL: https://dspace.mit.edu/bitstream/handle/1721.1/105933/964695278-MIT.pdf (Year: 2016).*

(Continued)

*Primary Examiner* — Linglan Edwards
*Assistant Examiner* — Joshua Raymond White
(74) *Attorney, Agent, or Firm* — ArentFox Schiff LLP; Michael Fainberg (57) ABSTRACT

Disclosed herein are systems and methods for preserving data integrity when integrating secure multiparty computation (SMPC) and blockchain technology. In one exemplary aspect, a method may split, via a data publisher, data into a plurality of data secret shares using an SMPC protocol, wherein each secret share of the plurality of data secret shares is assigned to an SMPC compute node of a plurality of SMPC compute nodes and wherein the plurality of SMPC compute nodes may be members of a blockchain network. In some aspects, the method may determine parameters of a message authentication code (MAC) condition based on the data, may generate secret shares of the MAC condition parameters, and may include a plurality of MAC secret shares with the plurality of data secret shares.

21 Claims, 4 Drawing Sheets

(51) Int. Cl.
*H04L 9/06* (2006.01)
*H04L 9/30* (2006.01)
*H04L 9/00* (2022.01)

(52) U.S. Cl.
CPC .......... *H04L 9/3066* (2013.01); *H04L 9/3247* (2013.01); *H04L 9/50* (2022.05)

(56) References Cited

OTHER PUBLICATIONS

Bendlin et al. "Semi-homomorphic Encryption and Multiparty Computation" [online], IACR, May 2011 [retrieved Feb. 23, 2022], Retrieved from the Internet: URL: https://eprint.iacr.org/2010/514.pdf (Year: 2011).*

* cited by examiner

SYSTEMS AND METHODS FOR PRESERVING DATA INTEGRITY WHEN INTEGRATING SECURE MULTIPARTY COMPUTATION AND BLOCKCHAIN TECHNOLOGY

FIELD OF TECHNOLOGY

The present disclosure relates to the field of secure multiparty computation (SMPC), and, more specifically, to systems and methods for preserving data integrity when integrating SMPC and blockchain technology.

BACKGROUND

A blockchain is a decentralized, distributed digital ledger that is used to record transactions across many nodes (e.g., servers) such that any record cannot be altered retroactively (e.g., tampering), without the alteration of all subsequent blocks on the majority of nodes. Although blockchains prevent stored records from being changed, storing information on a blockchain or in any database-like system does not keep the data private or secured. For example, the information on a blockchain is not private from the parties/nodes participating in the blockchain. Blockchains only protect the integrity of data, while database-like systems simply store data. In this case, data integrity is the guaranteeing that data has not been tampered with (e.g., if a client publishes the value 10, it should not be able to be changed without detection).

The integrity of the data should remain intact. Furthermore, the data should remain private. An approach to keeping data private is encryption. However, encrypting data raises issues around key management and functionality, where traditional encrypted values cannot be computed over until they are decrypted. If decryption actually occurs, the data meant to be private is ultimately revealed. Whereas if private data is processed without being revealed, data integrity still needs to be preserved, even once off-chain or retrieved from a database-like system.

SUMMARY

To combat these shortcomings, aspects of the present disclosure describe methods and systems for preserving data integrity and privacy when integrating secure multiparty computation (SMPC) and blockchain technology.

In one exemplary aspect, a method may split, via a data publisher, data into a plurality of data secret shares using a SMPC protocol, wherein each secret share of the plurality of data secret shares is assigned to an SMPC compute node of a plurality of SMPC compute nodes and wherein the plurality of SMPC compute nodes may be members of a blockchain network. In some aspects, the method may determine parameters of a message authentication code (MAC) condition based on the data, may generate secret shares of the MAC condition parameters, and may include a plurality of MAC secret shares with the plurality of data secret shares. In this case, each secret share assigned to a respective SMPC compute node comprises a secret share of the data and a secret share of the MAC condition parameters.

For each respective secret share, the method may identify, from the plurality of SMPC compute nodes, a respective SMPC compute node assigned to the respective secret share (comprising the data secret share and the MAC secret share). The method may retrieve a respective public key of the respective SMPC compute node. The method may encrypt the respective secret share using the respective public key and publish the encrypted respective secret share on a blockchain or into a database system. Furthermore, with each respective secret share encrypted using a respective public key, the plurality of encrypted secret shares may be published to a single blockchain or database system.

For each respective secret share, the method may identify, from the plurality of SMPC compute nodes, a respective blockchain or database system assigned to the respective secret share. The method may push the respective secret share onto the respective blockchain or database system. The respective blockchains may each be comprised of separate parties participating in the network; thus, no single party receives secret shares for multiple SMPC compute nodes of the plurality of SMPC compute nodes. The respective database systems too may each be on separate parties; thus, no single party receives secret shares for multiple SMPC compute nodes of the plurality of SMPC compute nodes.

In some aspects, the method may send a respective secret share (comprising both the data secret share and the corresponding MAC secret share) to a respective database system of a plurality of database systems. The method may further send a receipt/digital signature of the respective secret share to the blockchain.

In some aspects, the method may further generate, via the data publisher, a random number (R) within a public mod value (M), where M is known by the plurality of SMPC compute nodes and R is not known. The method may compute $V \times R \times MAC_{key2}$ to determine $MAC_{v2}$ mod M, wherein V is the data, $MAC_{key2}$ is a public message authentication code key known by the plurality of SMPC compute nodes and $MAC_{v2}$ is a message authentication code. The method may determine $R^{-1}$, wherein $R^{-1}$ is an inverse of R in mod M. The method may then include additional secret shares of $R^{-1}$ and $MAC_{v2}$ in the plurality of secret shares for storing (e.g., encrypted and published on a blockchain), wherein each respective secret share of $R^{-1}$ and $MAC_{v2}$ is matched with a corresponding secret share of the data in the plurality of data secret shares.

In some aspects, for each respective secret share, the method may retrieve, via a data querier, the encrypted respective secret share from the blockchain or database system. The method may send the encrypted respective secret share to the assigned respective SMPC compute node and an indication of a secure function to perform. The respective SMPC compute node may be configured to decrypt the encrypted respective secret share using a private key of the respective SMPC compute node, execute the secure function on the decrypted respective secret share in response to verifying data integrity of the decrypted respective secret share, publish, on the blockchain, a digital signature of a result of the execution, and transmit the result to the data querier.

In some aspects, for each respective secret share, the method may request, via a data querier, a secure function to be performed. The respective SMPC compute node may be configured to retrieve the required secret shares from the blockchain or database system, decrypt the encrypted respective secret share using a private key of the respective SMPC compute node, execute the secure function on the decrypted respective secret share in response to verifying data integrity of the decrypted respective secret share, publish, on the blockchain, a digital signature of a result of the execution, and transmit the result to the data querier.

In some aspects, each respective SMPC compute node of the plurality of SMPC compute nodes may be configured to convert the MAC for a respective secret share from using the publicly known MAC key (i.e., $MAC_{key2}$), to a secret MAC key ($MAC_{key1}$) which is unknown to any of the SMPC compute nodes. A secret value F is defined as the value to convert $MAC_{key2}$ to $MAC_{key1}$ within mod M, such that $MAC_{key2} \times F = MAC_{key1}$ mod M is satisfied. The plurality of SMPC compute nodes may jointly compute, for each secret share, $MAC_{v2} \times F \times R^{-1}$ within mod M to give $MAC_{v1}$, where $V \times MAC_{key1}$ is equivalent to the value $MAC_{v1}$. The plurality of SMPC compute nodes may use the secret MAC key for any secure computation, thus maintaining data integrity.

In some aspects, the plurality of SMPC compute nodes may convert results, which may still be in a secret share format, from the secret MAC key to the public MAC key. The plurality of SMPC compute nodes may jointly compute $MAC_{v1} R \times F^{-1}$ giving $MAC_{v2}$, where R is a secret randomly generated value, and $F^{-1}$ is the inverse of the secret value F within mod M.

In some aspects, the plurality of SMPC compute nodes may return the secret shares of the result value V, $R^{-1}$, and $MAC_{v2}$. Furthermore, the share may be pushed back into the blockchain or database system, or returned back to the data querier.

In some aspects, the plurality of SMPC compute nodes may return encrypted secret shares of the result value V, $R^{-1}$, and $MAC_{v2}$ using a provided public key, or using each respective public key for each respective SMPC compute node. Furthermore, the encrypted share may be pushed back into the blockchain or database system, or returned back to the data querier.

In some aspects, the method may receive, via the data querier, a respective result from each of the plurality of SMPC compute nodes and the plurality of secret shares. The method may join each of the plurality of secret shares received from the plurality of SMPC compute nodes to determine V, $R^{-1}$ and $MAC_{v2}$. The method may then verify the data integrity by determining whether $V \times R \times MAC_{key2}$ equals $MAC_{v2}$ mod M. In response to determining that $V \times R \times MAC_{key2}$ equals $MAC_{v2}$ mod M, the method may determine that the respective results are authentic.

In some aspects, the digital signature may be generated using a hash function (e.g., MD5, SHA1, etc.) comprising information including but not limited to source code of the secure function, input data, and/or the result. For data in secret shares such as input data, a signature for each SMPC compute node may be generated individually, or the hash function itself may be defined as a SMPC function, thus, inputs of the hash function are in secret shares.

In some aspects, the method may verify the result via an auditor that is configured to request the decrypted secret share and the secure function, perform the secure function on the decrypted secret share to determine a second result, and compare the result of the respective SMPC compute node with the second result.

In some aspects, the method may verify the result via an auditor that is configured to transfer the plurality of data secret shares into a different secure environment, perform the secure function within the different secure environment to determine a second result, and compare the result of the respective SMPC compute node with the second result. For example, Intel SGX or homomorphic encryption may be used to perform the verification.

In some aspects, a data querier transmits assignment information to each of the plurality of SMPC compute nodes indicating which respective encrypted secret share to retrieve from the blockchain or database system, and wherein each respective SMPC compute node directly retrieves the assigned respective secret share from the blockchain or database system.

In some aspects, a respective SMPC compute node of the plurality of SMPC compute nodes detects the publishing of new data into a blockchain and automatically retrieves and decrypts the encrypted respective secret share.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for preserving data integrity and privacy when integrating SMPC and blockchain technology. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Secret sharing refers to distributing a secret amongst a group of participants, where each participant is allocated a share of the secret. Individual shares are of no use on their own, as the secret can only be reconstructed when a number of shares are combined together. SMPC frameworks allow multiple parties to jointly compute a function, such that their inputs remain private, using secret sharing. More specifically, data is protected by being split into secret shares, where each party receives a subset of these shares. Therefore each party cannot see the real data. For example, the secret "10" can be split into secret shares "3," "2," and "5," whose sum (i.e., 3+2+5) gives 10.

Message Authentication Codes (MACs) are used to guarantee the integrity of a message, or in this case data, to prove that the data has not been changed. In order to verify a MAC, a MAC condition is assessed, namely, whether the formula $V \times MAC_{key} = MAC_V$ mod M holds true. Here, V represents the data. SMPC Traditional MACs use the formula $V \times MAC_{key} = MAC_V$ mod M such that if a change is made to V, a change needs to be made to $MAC_V$ to keep the formula true, i.e. that $V \times MAC_{key}$ gives $MAC_V$. For SMPC systems, the $MAC_{key}$ is not known by any single party, making it improbable that one SMPC node can change a secret share of V, and make a corresponding change to the secret share of $MAC_V$.

SMPC frameworks often have some form of data integrity mechanism built-in, in order to prevent the SMPC compute nodes from modifying their individual shares during execution—thus changing the value that was originally shared. For example, suppose that V=10 and the secret shares are 2, 3 and 5, which yield a sum of 10. If a node changes their share, the resulting V would no longer be 10. The MAC stops this change from happening because the MAC condition would break.

However, the processes of the secret shares being encrypted, being stored on a blockchain or a database, and then being uploaded to the compute nodes, require some form of data integrity check at each stage. In the present disclosure, the integration of SMPC and blockchain technology thus utilizes two MACs: (1) the traditional MAC used in the SMPC compute nodes, and (2) a MAC used to keep the data protected during storage and while the data is being uploaded and converted into the traditional MAC on the compute nodes.

Figure 1:
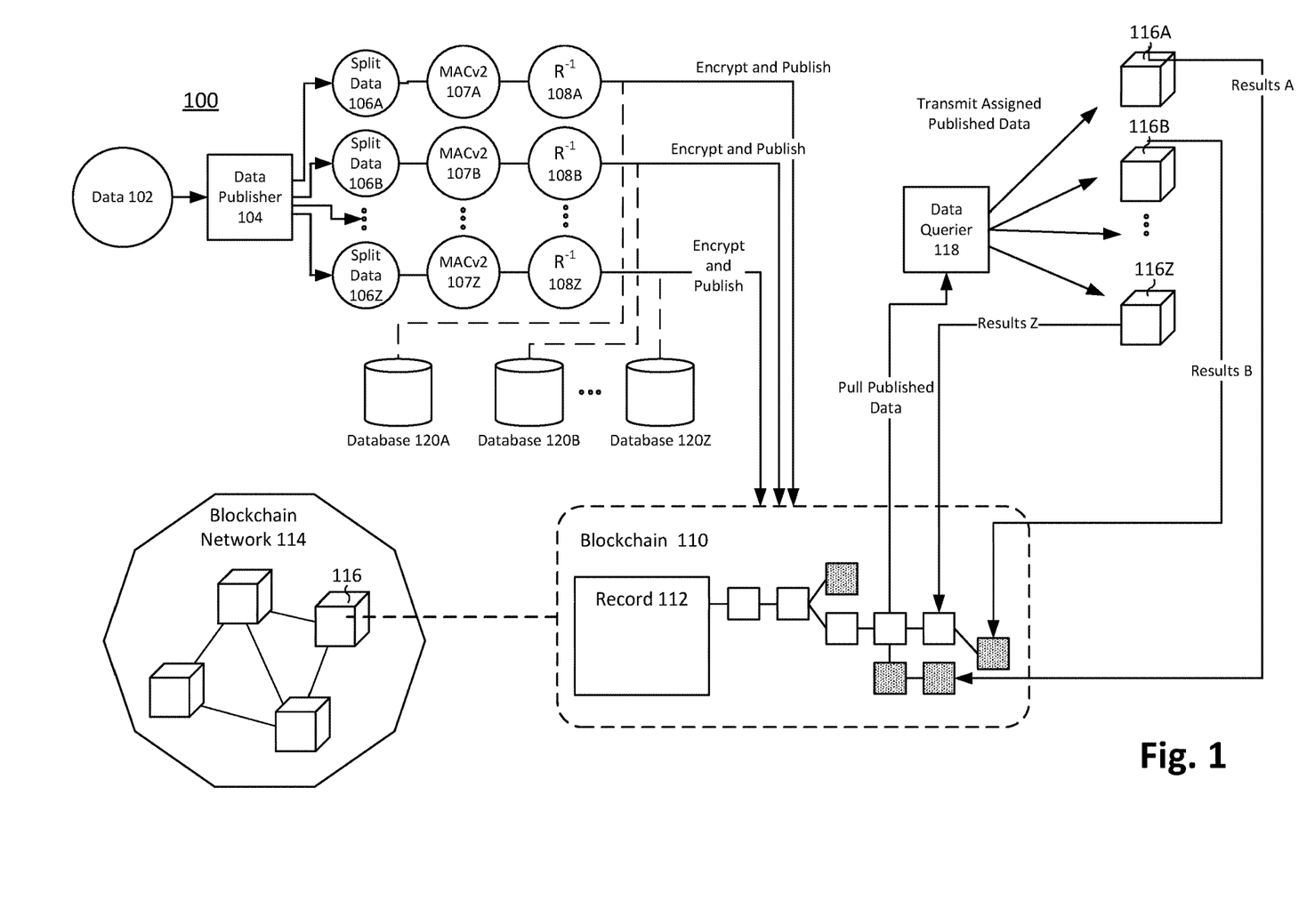
FIG. 1 is a block diagram illustrating a system for integrating SMPC into blockchain technology, in accordance with aspects of the present disclosure.

FIG. 1 is a block diagram illustrating system 100 for integrating SMPC into blockchain technology, in accordance with aspects of the present disclosure. System 100 comprises data 102, which may be a dataset holding information that is confidential. Data publisher 104 may be a node (e.g., a computer, server, etc.) that stores information in a database or on blockchain 110. Blockchain 110 is a distributed ledger comprising a plurality of records 112. Blockchain 110 may be managed by nodes 116 of blockchain network 114. Nodes 116 may each comprise a copy of blockchain 110. In some aspects, data publisher 104 is a member of blockchain network 114.

As discussed previously, the benefit of storing data 102 on blockchain 110 is that the integrity of data 102 is maintained because blockchains are tamper-resistant. However, blockchain 110 in the traditional sense does not keep the information of data 102 confidential as each node 116 of blockchain network 114 may be able to view the contents of data 102.

Data querier 118 may be a node that wants to run a query over data 102, but should not have access to the information contained in data 102. For example, suppose that blockchain network 114 is made up of computers belonging to employees of a company, such that each node 116 represents a respective employee's computer. Data publisher 104 may be a computer belonging to a human resources coordinator. Blockchain 110 may comprise company information that all employees can access to prevent tampering by an outside malicious entity (e.g., a hacker attempting to alter salary information). In this example, data 102 may comprise the salary information for a group of ten new employees that have been hired by the company. Data querier 118 may be a legacy employee that would like to know the average salary of the new hires. However, because salary information is generally confidential for each employee, data 102 should be stored in a manner on blockchain 110 such that data querier 118 cannot directly see the salary information. Although one may consider simply encrypting data 102, in order for the query to be performed, data querier 118 or any node 116 handling the query may need to decrypt data 102 and will thus see the information.

In an exemplary aspect, data publisher 104 utilizes an SMPC protocol such as additive secret sharing to split data 102 into a plurality of secret shares. These secret shares are listed as split data 106A-Z in FIG. 1. The number of splits depends on the number of compute nodes 116 that may handle the query. In some aspects, blockchain network 114 may allocate, from the plurality of nodes 116, a group of worker nodes that perform computations, a group of verification nodes that verify the results of computations, and a group of storage nodes that store records comprising data and results. Thus, data publisher 104 may split data 102 a number of times equal to the number of worker nodes in blockchain network 114 (e.g., if there are 10 worker nodes, there will be 10 instances of split data 106). In some aspects, the group of worker nodes may be a subset of the plurality of nodes in the blockchain network; furthermore, the group of worker nodes may consist of nodes that are not members of the blockchain network.

While defining a group of worker nodes to be SMPC compute nodes, the public modular value M may be specified or generated. In some aspects, once the group is defined, they can jointly and securely generate the values: $MAC_{key1}$, $MAC_{key2}$, F and $F^{-1}$. These values are initially in secret shares, before $MAC_{key2}$ is revealed and made public. The public values M and $MAC_{key2}$ may be published onto blockchain 110. For example, first generate M and $MAC_{key2}$ in plaintext, then F can be securely generated using some random number generator function, such that no SMPC party has knowledge of it. Once $MAC_{key2}$ and F exist, then $MAC_{key1}$ must exist. With mod M and the unknown value F, $F^{-1}$ can be securely calculated.

Suppose that data 102 comprises 10 salaries of the new hires in a 1×10 array. Data publisher 104 may create, from data 102, ten separate datasets that, when combined, equal the original respective dataset. For example, in data 102, the first element may be $90 k. The first element of each of split data 106 may be: $10 k, $5 k, $1 k, $9 k, $5 k, $50 k, $0, $5 k, $5 k, and $0. These then values add up to $90 k. However, when considered individually, one cannot determine the original value. Each of split data 106 may be assigned to a worker node of blockchain network 114. In the present disclosure, these worker nodes are known as SMPC compute nodes. One skilled in the art would appreciate that the splitting is more advanced in practice (e.g., may use multiplicative secret sharing, or use a polynomial equation to split the values).

To ensure that only the assigned SMPC compute node can see their assigned split data 106, data publisher 104 retrieves the public key of the respective SMPC compute node from blockchain 110 and encrypts the split data 106 using the public key. The encrypted split data 106 may thus only be decrypted by the assigned SMPC compute node with a private key that only the assigned SMPC compute node knows. It should be noted that each SMPC compute node has a different public key, and does not have knowledge of the other compute nodes private keys. For a blockchain approach, these public keys can be added to blockchain 110 for verification and integrity, where they may be retrieved by data publisher 104.

The encrypted secret shares (e.g., split data 106A-Z) are then be pushed onto blockchain 110, or stored in a database. In the case of a database approach, the respective databases can either be separate or integrated into the SMPC compute nodes 116A-Z. Thus, even if decrypted, the original salary is not revealed to any given SMPC compute node 116A-Z that is configured to perform a secure function. Furthermore, because the secret shares are stored on a blockchain that is distributed across blockchain network 114, the data is tamper-resistant.

To compute a secure function such as determining an average salary, data querier 118 may retrieve the required data (e.g., the encrypted secret shares) from blockchain 110 or the database, and send the shares to the assigned SMPC compute nodes 116A-Z. In some aspects, data querier 118 simply sends the data requirements to the assigned SMPC compute nodes (e.g., sends SMPC compute note 116A information about a record 112 comprising its assigned encrypted secret share). The plurality of SMPC compute notes may then directly read the respective data from blockchain 110 (either locally or remotely), or from their own respective databases.

The SMPC compute nodes 116A-Z may then decrypt their respective assigned split data 106. For example, SMPC compute node 116A may decrypt split data 106A using its private key. Subsequent to decryption, SMPC compute node 116A may execute its secure function, and store a signature of the result back onto blockchain 110, before securely sending the results back to data querier 118. The signature can include program source code of the secure function, the input values in their secret share format, and the result share for verification later, thus, each SMPC compute node publishes a signature.

For example, SMPC compute node 116A may receive a 1×10 array that comprises secret shares salary information. The secure function may involve adding each element of the 1×10 array. In this particular example, the sum of the elements determined by SMPC compute node 116A is not the average. However, each sum from the remaining 9 SMPC compute nodes 116B-Z may be added with the sum determined by node 116A and divided by 10. This computation does not reveal the individual salaries of the 10 new hires, and successfully provides the average salary. More specifically, each SMPC compute node may provide their sums to data querier 118, which may perform the final computations to obtain the average. One skilled in the art will appreciate that these example functions are described for simplicity, and that in practice, more advanced functions and protocols may be used.

In order to actually retain the qualities of keeping data private and ensuring data integrity, MAC conditions may be used. For the SMPC compute nodes, the equation $V \times MAC_{key1} = MAC_{v1}$ mod M is used, where V is the value being protected (e.g., data 102), the $MAC_{key1}$ is an unknown value shared across the SMPC compute nodes 116A-Z, and the product of V and $MAC_{key1}$ results in $MAC_{v1}$ within the systems public mod value M. Therefore, V and $MAC_{v1}$ are a tuple during execution, where any computation over V is applied to $MAC_{v1}$ such that the MAC condition holds true. Any malicious changes to V are very difficult to apply to $MAC_{v1}$ as the $MAC_{key1}$ is not known by any party, because V, $MAC_{v1}$, and $MAC_{key1}$ are in secret shares. For example, if V=10, M=127 and $MAC_{key1}$=5, then $MAC_{v1}$ would be 50, splitting $MAC_{v1}$ into two shares could be 20 and 30, while V could be 6 and 4. However, given that $MAC_{v1}$ is secret such that no single party knows the value is 5, if the secret share of $V_0$ (6) is increased by two ($V_0$=8), then the share of $MAC_{v10}$ (20) needs to be increased by $2 \times MAC_{key1}$. However, because $MAC_{key1}$ is unknown, it is improbable that the correct change will be applied to $MAC_{v1}$.

This process needs to apply a MAC during the upload process (i.e., when split data 106 which is written onto blockchain 110 as a record 112 is transmitted to an SMPC compute node). However, if $MAC_{key1}$ is used, then a respective SMPC compute node can make any changes to V because if $MAC_{key1}$ is known by any member of the blockchain network 114, then it is assumed to be public knowledge, breaking the above requirement that assumes $MAC_{key1}$ is not known. To solve this, the present disclosure adds a second MAC value to the exemplary aspect such that $V \times R \times MAC_{key2} = MAC_{v2}$ mod M. Here, $MAC_{key2}$ is a key that is securely computed such that it has some unknown factor F, which when multiplied gives $MAC_{key1}$ (i.e., $MAC_{key2} \times F = MAC_{key1}$ mod M). Data publisher 104 generates and applies random value R, where the inverse of R in modulo M, $R^{-1}$, is also encrypted (e.g., split into secret shares) and stored with the tuple (V,_$MAC_{v2}$), giving (V,_$MAC_{v2}$,_$R^{-1}$) and is used to protect the data when the data is being converted from $MAC_{key2}$ to $MAC_{key1}$.

It should be noted that the three values in the tuple are split into secret shares before encryption. For example, when data publisher 104 splits data 102 into split data 106A-Z based on the number of SMPC compute nodes that will perform a secure function, $R^{-1}$ is also split into multiple values (i.e., $R^{-1}$ 108A-Z) using an SMPC protocol and $MAC_{v2}$ is split into multiple values (i.e., $MAC_{v2}$ 107A-Z). As shown in FIG. 1, the values split data 106A, $MAC_{v2}$ 107A, and $R^{-1}$ 108A are assigned to SMPC compute node 116A. Thus, during encryption, the three values are collectively encrypted using SMPC compute node 116A's public key. This also applies to the remaining tuples and their respective compute nodes.

The conversion uses the equation $MAC_{v2} \times F \times R^{-1} = MAC_{v1}$ mod M, which results in $MAC_{key2}$ being converted to the unknown $MAC_{key1}$. More specifically, each SMPC compute node 116A-Z may decrypt a respective encrypted tuple and then jointly compute $MAC_{v2} \times F \times R^{-1} = MAC_{v1}$ mod M for each data value. This will convert between the two MAC values. The respective SMPC compute node may then perform the secure function as normal. For example, if V=10, M=11243, $MAC_{key2}$=5, R=3 and F=2, then $MAC_{v2}$ is 150, and $MAC_{key1}$=10 ($MAC_{key2} \times F$). During conversion, first F is applied to convert $MAC_{key2}$ to $MAC_{key1}$, 150×2=300, then the random value is removed by multiplying the inverse of R ($R^{-1}$=3748 within mod M), 300×3748=100 mod M, therefore $MAC_{v1}$=100. If the values are split into two shares, where V=7 and 3, $R^{-1}$=3048 and 700, and $MAC_{v2}$=100 and 50, then increasing the first share of V by two, giving 9, means the first share of $MAC_{v2}$ needs to be increased by $2 \times MAC_{key2} \times R$, however the value R is unknown to the SMPC compute nodes as it is a secret share. Thus it is improbable that a malicious node can make modifications to the values without breaking the MAC condition.

To return the result of the secure function, the respective SMPC compute node converts the secret shares back to the public MAC key (i.e., $MAC_{key2}$). This is accomplished by the compute node multiplying $MAC_{v1}$ by some random number R in mod M and then $F^{-1}$ in mod M, giving $MAC_{v2}$. It should be noted that R is generated within the SMPC environment, so is not known by any of the SMPC compute nodes. The respective SMPC compute node then returns back the result V, $R^{-1}$, and $MAC_{v2}$ to data querier 118, where $R^{-1}$ is the inverse of R in mod M.

The order of operations is important in protecting the integrity of data 102. If $R^{-1}$ were to be applied first, a SMPC compute node (e.g., 116A) could make a modification to V (e.g., by changing split data 106 when performing a secure function). However, because all SMPC compute nodes perform the same operation at the same time, and communicate with each other during said operations, by applying F first, then $R^{-1}$, for a compute node to maliciously change V (or more specifically a secret share of V), then $R^{-1}$ would need to be known, which is only known by data publisher 104 whom pushed this data. The individual compute nodes only receive a portion of $R^{-1}$ and do not know the original value. Therefore, the data integrity is maintained throughout the data flow, including being pushed onto blockchain 110, being uploaded to the SMPC compute nodes 116A-Z, and being executed using the two MAC process.

The opposite function can be applied to return results back to data querier 118 and possibly back onto blockchain 110 (where each share would be encrypted again). The resulting $MAC_{v1}$ can be multiplied by some random R value (the plaintext R is unknown to the SMPC compute nodes at the time of execution) and $F^{-1}$. This converts the MAC key back to $MAC_{key2}$ which is publicly known, and can be used to verify the results (only once all the shares are received and combined can the result be modified, as R needs to be known).

With the process as described, SMPC compute nodes 116A-Z manage their own keys. In some aspects, the keys may be managed by another SMPC compute network, or by multiple third-parties whom are responsible for one of the X shares, where X is the number of SMPC compute nodes. During the data upload process, SMPC compute nodes 116A-Z may request for the decryption of their shares (where each share could use a different encryption key), either by the other party decrypting it, or by being provided with the decryption key for that share.

In some aspects, rather than using blockchain 110 to store results, keys, and shares data publisher 104 may store the data in a database system (e.g., databases 120A-Z). In some aspects, data publisher 104 may utilize a combination of blockchain 110 and databases 120. For example, data publisher 104 may send a respective secret share (comprising both the data secret share and the corresponding MAC secret share) to a respective database system of a plurality of database systems (e.g., secret share A to database 120A, secret share B to database 120B, etc.). Data publisher 104 may further send a receipt/digital signature of the respective secret share to blockchain 110. Furthermore, if each respective secret share is encrypted with the public key of the respective SMPC compute node, a single database 120 could be used to store all the encrypted shares.

Figure 2:
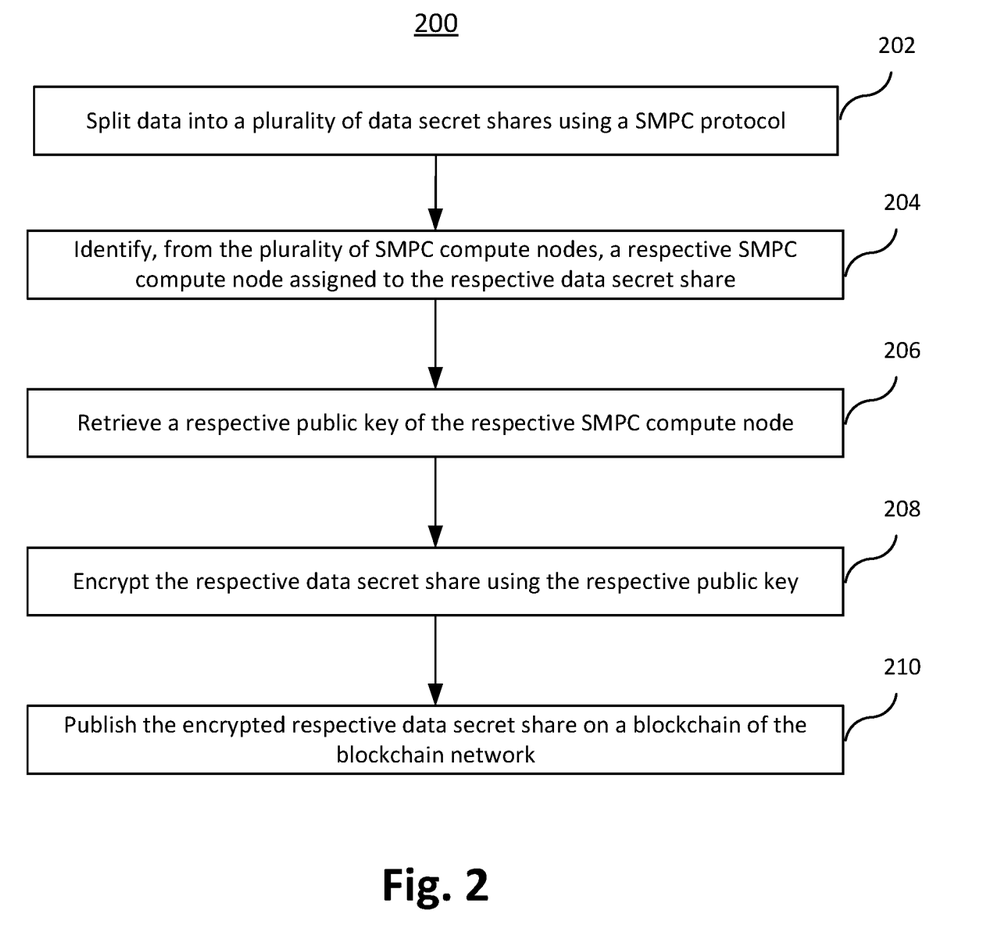
FIG. 2 illustrates a flow diagram of a method for publishing encrypted secret shares generated using a SMPC protocol on a blockchain, in accordance with aspects of the present disclosure.

FIG. 2 illustrates a flow diagram of method 200 for publishing encrypted secret shares generated using a SMPC protocol on a blockchain, in accordance with aspects of the present disclosure. At 202, data publisher 104 splits data (e.g., data 102) into a plurality of data secret shares (e.g., split data 106A-Z) using a SMPC protocol such as additive secret sharing. In some aspects, at 202, data publisher 104 further determines parameters of a MAC condition (e.g., $R^{-1}$ and $MAC_{v2}$) based on the data, generates secret shares of the MAC condition parameters, and includes the secret shares in a plurality of MAC secret shares. The combination of the plurality of data secret shares and the plurality of MAC secret shares is referred to as the plurality of secret shares. This is further discussed in FIG. 3.

At 204, data publisher 104 identifies, from the plurality of SMPC compute nodes (e.g., nodes 116A-Z), a respective SMPC compute node assigned to the respective data secret share. For example, split data 106A may be assigned to SMPC compute node 116A. At 206, for each secret share, data publisher 104 retrieves a respective public key of the respective SMPC compute node. At 208, data publisher 104 encrypts the respective data secret share using the respective public key. At 210, data publisher 104 publishes the encrypted respective secret share on a blockchain (e.g., blockchain 110) of the blockchain network (e.g., network 114).

Figure 3:
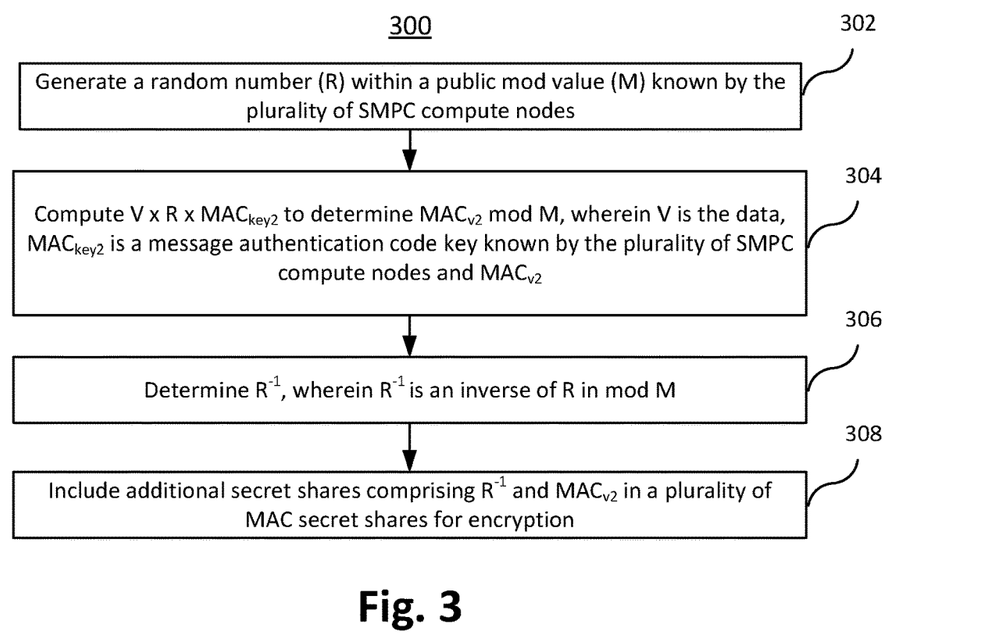
FIG. 3 illustrates a flow diagram of a method for determining arguments of a MAC condition, in accordance with aspects of the present disclosure.

FIG. 3 illustrates a flow diagram of method 300 for determining arguments of a MAC condition, in accordance with aspects of the present disclosure. Method 300 may be executed after 202 and before 204 of method 200. At 302, data publisher 104 generates a random number (R) within a public mod value (M), where M is known by the plurality of SMPC compute nodes. At 304, data publisher 104 computes $V \times R \times MAC_{key2}$ to determine $MAC_{v2}$ mod M, wherein V is the data, $MAC_{key2}$ is a message authentication code key known by the plurality of SMPC compute nodes and $MAC_{v2}$ is the message authentication code. At 306, data publisher 104 determines wherein $R^{-1}$ is an inverse of R in mod M. At 308, data publisher 104 includes additional secret shares comprising $R^{-1}$ and $MAC_{v2}$ in the plurality of MAC secret shares for encryption. Accordingly, each respective secret share assigned to a respective SMPC compute node comprises a portion of the data (e.g., split data 106A) and a secret share of the MAC condition parameters (e.g., $MAC_{v2}$ 107A and $R^{-1}$ 108A).

Figure 4:
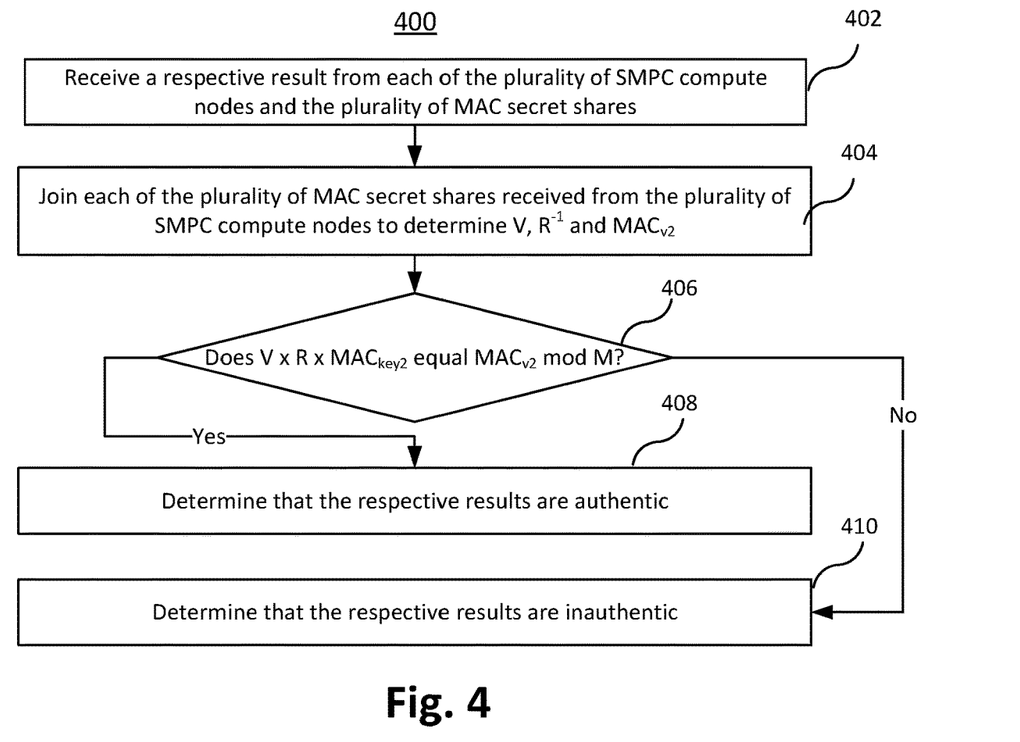
FIG. 4 illustrates a flow diagram of a method for authenticating a result by verifying the MAC condition, in accordance with aspects of the present disclosure.

FIG. 4 illustrates a flow diagram of a method for authenticating a result by verifying the MAC condition, in accordance with aspects of the present disclosure. At 402, data querier 118 receives a respective result from each of the plurality of SMPC compute nodes (e.g., nodes 116A-Z) and the plurality of secret shares. At 404, data querier 118 joins each of the plurality of MAC secret shares received from the plurality of SMPC compute nodes to determine V, $R^{-1}$ and $MAC_{v2}$. At 406, data querier 118 determines whether data integrity is preserved for the data (V), by verifying if the MAC condition is satisfied. More specifically, data querier 118 determines whether $V \times R \times MAC_{key2}$ equals $MAC_{v2}$ mod M. In response to determining that the MAC condition is satisfied, method 400 advances to 408, where data querier 118 determines that the respective results are authentic (because the inputs have not been tampered with). In response to determining that the MAC condition is not satisfied, method 400 advances to 410, where data querier 118 determines that the respective results are inauthentic. This is an indication that one of the split data 106 has been altered while the data was stored on blockchain 110, during the uploading process to one or more of the SMPC compute nodes, or while the results were being calculated (e.g., one of the nodes is malicious).

Figure 5:
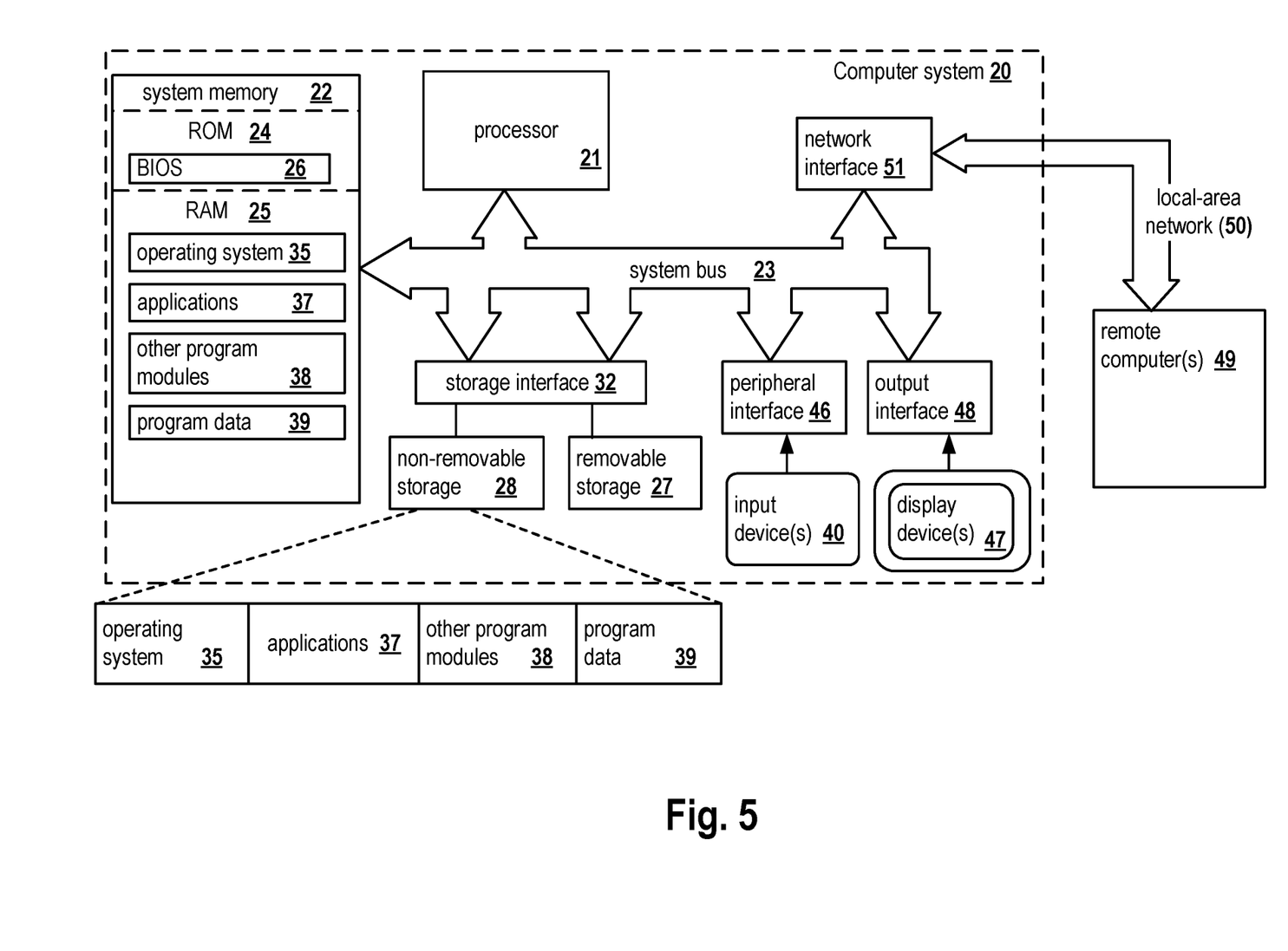
FIG. 5 presents an example of a general-purpose computer system on which aspects of the present disclosure can be implemented.

FIG. 5 is a block diagram illustrating a computer system 20 on which aspects of systems and methods for preserving data integrity when integrating SMPC into blockchain technology may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preserving data integrity when integrating secure multiparty computation (SMPC) and blockchain technology, the method comprising:
   splitting, via a data publisher, data into a plurality of data secret shares using a SMPC protocol;
   generating, using the SMPC protocol, a plurality of message authentication code (MAC) secret shares of MAC condition parameters that ensure integrity of the data by:
      generating, via the data publisher, a random number within a public mod value known by a plurality of SMPC compute nodes;
      computing a message authentication code (MACv2) based on the data, the random number, and a message authentication code key known by the plurality of SMPC compute nodes;
      determining an inverse of the random number; and
      including additional secret shares of the inverse and the $MACv_2$, in the plurality of MAC secret shares for encryption and publication on the blockchain, wherein each respective secret share of the inverse and the MACv2 is matched with a corresponding data secret share in the plurality of data secret shares;
   wherein each data secret share of the plurality of data secret shares and each MAC secret share of the plurality of MAC secret shares is assigned to an SMPC compute node of the plurality of SMPC compute nodes; and
   for each respective data secret share and MAC secret share:
      identifying, from the plurality of SMPC compute nodes, a respective SM PC compute node assigned to the respective data secret share and MAC secret share;
      retrieving a respective public key of the respective SMPC compute node;
      encrypting the respective data secret share and MAC secret share using the respective public key; and
      publishing the encrypted respective data secret share and MAC secret share on a blockchain.

2. The method of claim 1, wherein the plurality of SMPC compute nodes are members of a blockchain network managing the blockchain.

3. The method of claim 1, wherein at least one SMPC compute node of the plurality of SMPC compute nodes is not a member of a blockchain network managing the blockchain.

4. The method of claim 1, further comprising publishing the encrypted respective data secret share and MAC secret share on a database system.

5. The method of claim 4, further comprising publishing a signature of the encrypted respective data secret share and MAC secret share on the blockchain.

6. The method of claim 1, further comprising:
   publishing the encrypted respective data secret share and MAC secret share to a respective database system of a plurality of database systems such that no single entity has access to multiple data secret shares and multiple MAC secret shares in one database system.

7. The method of claim 1, wherein computing $MAC_{v2}$ comprises:
   computing $V \times R \times MAC_{key2}$ to determine $MAC_{v2}$ mod M, wherein V is the data, $MAC_{key2}$ is the message authentication code key known by the plurality of SMPC compute nodes R is the random number within the public mod value (M), and;

R$^{-1}$ is the inverse of R in mod M.

8. The method of claim 7, further comprising for each respective data secret share and each respective MAC secret share:

retrieving, via a data querier, the encrypted respective data secret share and the respective MAC secret share from the blockchain;

sending the encrypted respective data secret share and the respective MAC secret share to the assigned respective SMPC compute node and an indication of a secure function to perform, wherein the respective SMPC compute node is configured to:

decrypt the encrypted respective data secret share using a private key of the respective SMPC compute node;

convert the MAC$_{key2}$ of the respective MAC secret share to MAC$_{key1}$ by computing MAC$_{v2}$×F×R$^{-1}$ mod M;

in response to verifying data integrity of the decrypted respective data secret share, executing the secure function on the decrypted respective data secret share;

convert the MAC$_{key1}$ to the MAC$_{key2}$ of the respective MAC secret share by computing MAC$_{v1}$×R×F$^{-1}$ mod M;

publish, on the blockchain, a digital signature of a result of the execution; and transmit the result to the data querier.

9. The method of claim 8, further comprising:

receiving, via the data querier, a respective result from each of the plurality of SMPC compute nodes and the plurality of MAC secret shares;

joining each of the plurality of MAC secret shares and the respective results received from the plurality of SMPC compute nodes to determine V, R$^{-1}$ and MAC$_{v2}$;

verifying the data integrity by determining whether V×R×MAC$_{key2}$ equals MAC$_{v2}$ mod M; and in response to determining that V×R×MAC$_{key2}$ equals MAC$_{v2}$ mod M, determining the respective results are authentic.

10. The method of claim 8, further comprising verifying the result via an auditor that is configured to:

request the decrypted data secret share and the secure function;

perform the secure function on the decrypted data secret share to determine a second result; and compare the respective result of the respective SMPC compute node with the second result.

11. The method of claim 8, further comprising verifying the result via an auditor that is configured to:

transfer the plurality of data secret shares into a different secure environment;

perform the secure function within the different secure environment to determine a second result; and compare the respective result of the respective SMPC compute node with the second result.

12. The method of claim 1, wherein a data querier transmits assignment information to each of the plurality of SMPC compute nodes indicating which respective encrypted data secret share to retrieve from the blockchain, and wherein each respective SMPC compute node directly retrieves the assigned respective secret share from the blockchain.

13. The method of claim 1, wherein a respective SMPC compute node of the plurality of SMPC compute nodes detects the publishing of new data into the blockchain and automatically retrieves and decrypts the encrypted respective data secret share.

14. A system for preserving data integrity when integrating secure multiparty computation (SMPC) and blockchain technology, the system comprising: a hardware processor configured to:

split, via a data publisher, data into a plurality of data secret shares using a SMPC protocol;

generate, using the SMPC protocol, a plurality of message authentication code (MAC) secret shares of MAC condition parameters that ensure integrity of the data by:

generating, via the data publisher, a random number within a public mod value known by a plurality of SMPC compute nodes;

computing a message authentication code (MACv2) based on the data, the random number, and a message authentication code key known by the plurality of SMPC compute nodes;

determining an inverse of the random number; and including additional secret shares of the inverse and the MACv2 in the plurality of MAC secret shares for encryption and publication on the blockchain, wherein each respective secret share of the inverse and the MACv2 is matched with a corresponding data secret share in the plurality of data secret shares;

wherein each data secret share of the plurality of data secret shares and each MAC secret share of the plurality of MAC secret shares is assigned to an SMPC compute node of the plurality of SM PC compute nodes; and for each respective data secret share and MAC secret share:

identify, from the plurality of SMPC compute nodes, a respective SMPC compute node assigned to the respective data secret share and MAC secret share;

retrieve a respective public key of the respective SM PC compute node;

encrypt the respective data secret share and MAC secret share using the respective public key; and publish the encrypted respective data secret share and MAC secret share on a blockchain.

15. The system of claim 14, wherein the plurality of SMPC compute nodes are members of a blockchain network managing the blockchain.

16. The system of claim 14, wherein at least one SMPC compute node of the plurality of SMPC compute nodes is not a member of a blockchain network managing the blockchain.

17. The system of claim 14, wherein the hardware processor is further configured to publish the encrypted respective data secret share and MAC secret share on a database system.

18. The system of claim 17, wherein the hardware processor is further configured to publish a signature of the encrypted respective data secret share and MAC secret share on the blockchain.

19. The system of claim 14, wherein the hardware processor is further configured to:

publish the respective secret share to a respective database system of a plurality of database systems such that no single entity has access to multiple data secret shares and multiple MAC secret shares in one database system.

20. The system of claim 14, wherein the hardware processor is further configured to compute MAC$_{v2}$ by:

computing V×R×MAC$_{key2}$ to determine MAC$_{v2}$ mod M, wherein V is the data, MAC$_{key2}$ is the message authentication code key known by the plurality of SMPC compute nodes R is the random number within the public mod value (M), and;

$R^{-1}$ is the inverse of R in mod M.

21. A non-transitory computer readable medium storing thereon computer executable instructions for preserving data integrity when integrating secure multiparty computation (SMPC) and blockchain technology, including instructions for:

splitting, via a data publisher, data into a plurality of data secret shares using a SMPC protocol;

generating, using the SMPC protocol, a plurality of message authentication code (MAC) secret shares of MAC condition parameters that ensure integrity of the data by:

generating, via the data publisher, a random number within a public mod value known by a plurality of SMPC compute nodes;

computing a message authentication code (MACv2) based on the data, the random number, and a message authentication code key known by the plurality of SMPC compute nodes;

determining an inverse of the random number; and including additional secret shares of the inverse and the MACv2 in the plurality of MAC secret shares for encryption and publication on the blockchain, wherein each respective secret share of the inverse and the MACv2 is matched with a corresponding data secret share in the plurality of data secret shares;

wherein each data secret share of the plurality of data secret shares and each MAC secret share of the plurality of MAC secret shares is assigned to an SMPC compute node of the plurality of SM PC compute nodes; and for each respective data secret share and MAC secret share:

identifying, from the plurality of SMPC compute nodes, a respective SM PC compute node assigned to the respective data secret share and MAC secret share;

retrieving a respective public key of the respective SMPC compute node;

encrypting the respective data secret share and MAC secret share using the respective public key; and publishing the encrypted respective data secret share and MAC secret share on a blockchain.

* * * * *